Patented Apr. 5, 1932

1,852,093

UNITED STATES PATENT OFFICE

LLOYD SMEDE AND ERROL B. SHAND, OF PITTSBURGH, PENNSYLVANIA, ASSIGNORS TO WESTINGHOUSE ELECTRIC AND MANUFACTURING COMPANY, A CORPORATION OF PENNSYLVANIA

ARTICLE OF MANUFACTURE AND PROCESS OF MAKING IT

No Drawing.        Application filed November 7, 1928. Serial No. 317,790.

Our invention relates to articles of manufacture and to processes of making the same and particularly to articles including bonding material between vitreous material and metal.

One object of our invention is to provide a vitreous article coated with metal in which the metal shall penetrate the vitreous material to a sufficient depth, and retain an outer stratum of sufficient continuity and thickness to render the bond fluid tight and of sufficient mechanical strength to permit a further metal element to be substantially as effectively joined to the coating and thereby as effectively joined to the vitreous body as the element could be joined to another metal body.

Another object of our invention is to so apply a metal coating to a vitreous body as to avoid the pressence of vitreous particles at the surface of the metal coating.

Another object of our invention is to provide an article of the above indicated character that shall be simple and durable in construction, economical to manufacture and effective in its operation.

The art of fusing metallic coatings to vitreous objects of porcelain, glass and the like for decorative purposes has long been known. However, in such practice, the decorative metallic films or layers are usually extremely thin, as evidenced by the fact that some of them wear off by ordinary intermittent usage. This is true of china or porcelain articles for table and other uses.

In no decorative article of which we are aware is there a metallic coating of such strength or that penetrates the article to a sufficient depth or that has an outer metal stratum or surface film of sufficient continuity and thickness to permit relatively heavy or massive bodies of vitreous material and metal to be effectively joined to each other as two metal bodies may be joined.

The presence of metallic flowers and other designs on vitreous article has heretofore inspired inventors to suggest the idea of soldering or otherwise joining metal bodies to such metallic surface films but we do not know and do not believe that such idea has been carried into common and commercial practical effect before our present invention.

It is one thing to perceive what appears to be an adequate metallic film on a vitreous body and to straight-away suggest that a metal body may be soldered thereto, and another thing, as we have determined by much research and original endeavor, to actually provide such film and to achieve such result. In arriving at our result, we took advantage of prior suggestions but found little of value beyond the abstract facts attending the production of decorative films.

Many patents, some of them comparatively old, have been issued in this art; yet, so far as we are aware, none of the inventions covered by them have been productive of useful commercial articles such as have resulted from our invention.

It seems apparent that prior inventors who may not have been skilled both in ceramic work, such as glazing, and in metal work, such as soldering by wiped joints and the like, which are widely separated fields, may have superficially inquired into one or both of these arts and made the abstract suggestions, in the form of patent applications calling for definite materials and processes which are set forth in certain prior-art patents to which reference is made above.

These materials and processes, which may appear to closely simulate those of our invention, are, however, only combinations of the prior metallic films and metal working processes. This conclusion is strengthened by the apparent fact that no successful articles, such as we have produced, have made their appearance prior to our invention, which has been commercially employed, is of great value and has created much interest in several branches of industry.

The soldering or otherwise joining of metal to vitreous material so effectively as to be suited to our purposes is not merely a question of soldering to the prior art films by old methods of soldering metal to metal, but is attained only after many considerations have been taken into account, as are hereinafter set forth.

One consideration is that the metallic film on the vitreous body must be appreciably thicker than necessary for any decorative purpose.

Another consideration is that the metallic film must penetrate the vitreous material to a greater depth and, at the same time, retain an outer stratum of an entirely metallic character, i. e., one that contains no vitreous particles.

Another consideration is that, after the metal film has been applied, solder or other metal body must be so applied to the film as to prevent disruption of the film and the vitreous body.

Another consideration is the character and consistency of the vitreous material itself, as well as that of the coating medium employed, to obtain the most perfect structure.

Further consideration, such as the firing and cooling temperatures during the application of the film, the temperatures employed during the soldering and other factors must be observed to obtain the best results.

It is our aim to attain all of the above-mentioned objects and results and to overcome all of the objections to the prior-art suggestions, and, accordingly, in practicing our invention, we provide an article of manufacture and the process of making it, in which all of the above-mentioned factors are so observed and utilized as to render the article what we believe to be for the first time a successful, commercial, economical and practical object, including metal and vitreous elements that are joined substantially as well as any two elements may be joined to have the ultimate strength of the weaker of the two and a fluid tightness of a single homogeneous solid mass of one of the elements.

Therefore, in practicing our invention, while it is applicable to vitreous materials, such as glass and porcelain of various characteristics, we prefer to employ a high-temperature porcelain and a high-temperature silicate glaze thereon, such as are employed in the electrical industry for cable joints, pot heads, insulators, bushings, rectifier seals and the like.

The preferred silicate glaze is known as mahogany glaze containing approximately, Albany slip 85%, feldspar 5%, flint 5%, $Fe_2O_3$ 3% and $MnO_2$ 2%, although other glaze such as chocolate glaze, similarly devoid of pin holes or minute bubbles, may be utilized with good results.

The above-mentioned porcelain, in the form desired, is coated with the glaze and fired in a kiln in the usual manner.

When cooled, preferably to room temperature, the metallic glaze is applied, as by brushing, to the portion of the silicate glaze which it is desired to coat.

This metallic glaze, of which there are several kinds, is, however, of considerably greater metallic content than is necessary for purely decorative purposes, it, preferably, containing not less than seven per cent metallic residue whereby to obtain the desired results in a ready commercial manner, without requiring a too delicate control of the temperatures employed in heating it.

A preferred glaze comprises, in addition to the essential oils of lavender and of spice, about 7.85% metallic residue containing approximately 4.3% platinum, in the form of platinic chloride or metal, 3.1% gold, in the form of gold chloride or metal, 3% bismuth in the form of chloride or metal and about 1% insoluble residue.

The coated porcelain body is then fired to a temperature somewhere between 450° C. and 800° C., depending somewhat upon the heat-storage characteristics of the oven or furnace used.

If the oven and article can be heated quickly to the maximum temperature of about 800° C. and at once reduced, the result will be satisfactory. However, if there is lag in the heating and cooling cycle, a lower maximum temperature must be used, since the result is one of so-called "heat work" or a function of temperature and time.

The minimum temperature at which the salts will be decomposed and the metal unite with the glaze, even if a very long application of heat is employed, is probably 450° C.

During the early stages of the heating operation, it is desirable to maintain an oxidizing atmosphere, particularly where an electric furnace is employed, this atmosphere may be effectively maintained at a relatively high pressure for the period desired and relieved by shutting off the source of air pressure or otherwise.

The heating causes the metal to sink into the silicate glaze in substantially a homogeneous solid mix therewith and, only by observance of the steps herein taught, can the metallic glaze be controlled to sink to a sufficient depth and, at the same time, to retain an outer stratum of sufficient continuity and thickness to provide a bond of substantially absolute fluid tightness, a mechanical strength equal to the weaker of the bodies so joined, and an outer metal surface to which another metal element may be joined substantially as well as two metal bodies may be joined.

In completing the article for ready installation in the field, it is preferred to send it out already "tinned" and sometimes not only "tinned" but also provided with a further metal element autogeneously joined, as by soldering, or otherwise joined thereto, so that workers in the field will have only to solder metal to the tinned surface or make a metal-to-metal joint with the element soldered to it. Such a surface lends itself to building-up by soldering, welding, electro-plating and the like, whereby screw threads or other attaching means may be formed.

In "tinning" the metallic surface, the article may be preheated or, if at a safe temperature, be quickly dipped into and removed from a bath of the so-called half-and-half solder consisting of about 58% tin and 42% lead, with a suitable flux of neutral character, such as that containing ammonium chloride, glycerine, petrolatum, etc.; the solder or tin bath being preferably at a temperature between 200° C. and 235° C.

In applying the above-mentioned "tinned" surface, and in soldering another metal to this surface by means of a soldering iron, the solder should preferably be within the above-mentioned temperature range, and the iron and solder passed quickly through the positions at which the solder is applied. This action is necessary to prevent concentrated heating at local positions to thereby prevent cracking of the porcelain or glaze.

Other metallic glazes may be employed, such as silver nitrate mixed with a reducing agent, silver oxalate, and copper acetate.

While we have set forth our invention by describing a specific process in which specific materials and temperatures are employed, it is to be understood that the invention is not limited to these factors but also comprehends the use of all similar factors which obtain substantially the same structure and results as are set forth in the appended claims.

We claim as our invention:

1. The process of forming a coating body of metal on a vitreous body which comprises providing the vitreous body with a high-temperature glaze, in applying a fluid medium containing at least seven per cent metallic residue of the glaze and in heating the coated body at a sufficient temperature to volatilize the fluid and to cause the metal to unite in intimate bond with the vitreous material.

2. The process of forming a coating body of metal on a vitreous body which comprises providing the vitreous body with a high-temperature glaze including iron oxide, in applying a fluid medium containing at least seven per cent metallic residue to the glaze and in heating the coated body between 450 and 800 degrees centigrade.

3. The process of forming a coating body of metal on a vitreous body which comprises providing the vitreous body with a high-temperature glaze, including iron oxide, in applying a fluid medium containing at least seven per cent metallic residue including platinum to the glaze and in heating the coated body between 450 and 800 degrees centigrade.

4. The process of forming a coating body of metal on a vitreous body which comprises providing the vitreous body with a smooth high-temperature glaze containing iron oxide and manganese, in applying a fluid medium containing essential oil and at least seven per cent metallic residue including platinum and gold to the glaze and in heating the coated body between 450 and 800 degrees centigrade.

5. The process of forming a coating body of metal on a vitreous body which comprises providing the vitreous body with a smooth high-temperature glaze containing iron oxide and manganese, in applying a fluid medium containing essential oil and at least seven per cent metallic residue including platinum and gold to the glaze, in heating the coated body between 450 and 800 degrees centigrade, in reducing the temperature of the body and in quickly applying a solder of substantially half tin and half lead to the coated body at a temperature between 200 and 235 degrees centigrade.

6. The process of joining a metal body to a vitreous body which comprises providing the vitreous body with a smooth high-temperature glaze containing iron oxide and manganese, in applying a fluid medium containing essential oil and at least seven per cent metallic residue including platinum and gold to the glaze, in heating the coated body between 450 and 800 degrees centigrade, in reducing the temperature of the coated body, in quickly applying a solder of substantially half tin and half lead to the coated body at a temperature between 200 and 235 degrees centigrade, in again cooling the body, in placing a metal body adjacent to said solder and in joining said metal body to said solder by quickly running a similar solder at a similar temperature through local positions between the solder and metal body to be joined.

7. The process of forming a coating body of metal on a vitreous body which comprises providing the vitreous body with a high-temperature glaze, in applying a fluid medium containing substantially seven per cent metallic residue to the glaze and in heating the coated body at a sufficient temperature to volatilize the fluid and to cause the metal to unite in intimate bond with the vitreous material.

8. The process of forming a coating body of metal on a vitreous body having a high-temperature glaze which comprises applying a fluid medium containing at least seven per cent metallic residue to said glaze and in heating the coated body at a sufficient temperature to volatilize the fluid and to cause the metal to unite in intimate bond with the material of said glaze.

9. As an article of manufacture, the product produced by the process of claim 8 wherein the metal particles are co-mingled with particles of the vitreous body in substantially a homogenous solid mix to render the bond between the bodies substantially as strong as the weaker body.

In testimony whereof, we have hereunto subscribed our names this 6th day of November, 1928.

LLOYD SMEDE.
ERROL B. SHAND.

DISCLAIMER 1,852,093.—*Lloyd Smede* and *Errol B. Shand*, Pittsburgh, Pa. ARTICLE OF MANUFACTURE AND PROCESS OF MAKING IT. Patent dated April 5, 1932. Disclaimer filed August 2, 1939, by the assignee, *Westinghouse Electric & Manufacturing Company*.

Hereby enters this disclaimer to claim 9 of the patent.
[*Official Gazette August 22, 1939.*]